US007974942B2

(12) United States Patent
Pomroy et al.

(10) Patent No.: US 7,974,942 B2
(45) Date of Patent: Jul. 5, 2011

(54) DATA MASKING SYSTEM AND METHOD

(75) Inventors: Steven Patrick Pomroy, Mount Pearl (CA); Robert Raymond Lake, Mount Pearl (CA); Trevor Anthony Dunn, Mount Pearl (CA)

(73) Assignee: Camouflage Software Inc., St. John's (CA)

( * ) Notice: Subject to any disclaimer, the term of this patent is extended or adjusted under 35 U.S.C. 154(b) by 279 days.

(21) Appl. No.: 11/517,251

(22) Filed: Sep. 8, 2006
(Under 37 CFR 1.47)

(65) Prior Publication Data

US 2008/0065665 A1 Mar. 13, 2008

(51) Int. Cl.
*G06F 7/00* (2006.01)
(52) U.S. Cl. .......................................... 707/610; 707/616
(58) Field of Classification Search ........... 707/9, 104.1, 707/4, 100
See application file for complete search history.

(56) References Cited

U.S. PATENT DOCUMENTS

| | | | |
|---|---|---|---|
| 6,397,224 B1 | 5/2002 | Zubeldia et al. | |
| 2003/0014413 A1 | 1/2003 | Fujishima et al. | |
| 2003/0220927 A1 | 11/2003 | Iverson et al. | |
| 2004/0181670 A1 | 9/2004 | Thune et al. | |
| 2004/0199781 A1 | 10/2004 | Erickson et al. | |
| 2005/0198043 A1 | 9/2005 | Gruber et al. | |
| 2005/0198074 A1* | 9/2005 | Khayter et al. | ............ 707/104.1 |
| 2005/0251865 A1 | 11/2005 | Mont et al. | |
| 2006/0059148 A1 | 3/2006 | Dunki et al. | |
| 2006/0059149 A1 | 3/2006 | Dunki et al. | |
| 2006/0059189 A1 | 3/2006 | Dunki et al. | |
| 2006/0074897 A1* | 4/2006 | Fergusson | ......................... 707/4 |
| 2007/0156730 A1* | 7/2007 | Rothermel et al. | ........... 707/101 |
| 2008/0059524 A1* | 3/2008 | Biedenstein et al. | ...... 707/104.1 |
| 2009/0144299 A1* | 6/2009 | Ledwith et al. | ............... 707/100 |

OTHER PUBLICATIONS

Noel Yuhanna, Protecting Private Data with Data Masking,(Technology Can Help Meet Certain Compliance And Outsourcing Requirement), Mar. 21, 2006, Forrester Research Inc., 400 Technology Square, Cambridge, MA 02139 USA.

* cited by examiner

*Primary Examiner* — Shahid A Alam
*Assistant Examiner* — Donald Lawson
(74) *Attorney, Agent, or Firm* — Bereskin & Parr LLP/S.E.N.C.R.L.,s.r.l.

(57) ABSTRACT

A system and method for data masking target data fields of a data record uses an original database with data records having at least one target data field and a copied database including a copy of at least a portion of the original database. Data masking consists of adding a row-identifier column with an index to a primary data record to form a primary row-identifier data record, creating empty delta data records, performing data transformations on the target data fields to form masked delta data records, merging the masked delta data records with the primary row-identifier data record to form a masked primary data record, copying a related data record and joining with said primary row-identifier data record to form a related row-identifier data record and then merging the related row-identifier data record with the masked primary data record to form a masked related data record.

21 Claims, 6 Drawing Sheets

For each data record that needs to be masked...

DATA MASKING SYSTEM AND METHOD

FIELD

This invention relates generally to a system and method for data masking and in particular to a system and method for masking data in a database.

BACKGROUND

Enterprises typically rely on large databases of privacy-sensitive confidential information (financial, consumer, employee, etc.) for their key operational processes. Outside the production environment, similar databases are also needed for a number of other purposes such as software application development, testing, training, demonstrations, data mining and research. While production environments are usually highly protected with extensive security measures (firewalls, passwords, encryption, etc.), non-production environments are often times less secure. Accordingly, they are extremely vulnerable to potential data theft and/or unnecessary confidential data disclosure, especially in cases where companies simply use a copy of the original database without any security or privacy protection.

As such, data masking has been developed to provide desensitized (i.e. "masked") data for use in non-production environments, so that activities such as software development and testing, employee training, demonstrations, data mining, research, trapping potential data thieves using masked data as a "honey-pot", etc. can be performed without the risk of exposing privacy-sensitive information. However, as is highlighted below, certain data masking solutions are associated with various significant limitations.

For example, one data masking approach consists of using data generators to generate scrambled characters, such as replacing the name 'David Smith' with the sequence 'kajgt 48hgaso'. This replacement sequence is certainly desensitized, but does not have the same properties as the original name (e.g. it may not have the same character set, capitalized first letter, different length, hyphenated names, etc.).

Another example data masking approach involves the use of finite sets (i.e. pre-determined lists of values that will be used in place of the confidential data). This approach provides more realistic results than the scrambled character generation approach discussed above, but is certainly more limited in terms of the validity and completeness of the resultant masked database. This approach is also limited in terms of localization (e.g. the customer might have a Spanish name but the finite set only contains English names).

Another example data masking approach is utilized when enterprises attempt to mask data themselves (other than generating or using test sets, as discussed above) whereby they follow a very labor-intensive process of identifying all relevant fields in the original database and manually assigning new values or basic transformations to them. However, this approach comes with extremely high costs to produce and maintain the resultant database.

Accordingly, there is a need to better protect confidential and other privacy-sensitive information as it is stored and used within the enterprise for such non-production purposes as application development, testing, training, demonstrations, research and data mining, while maintaining the structure and form of the protected information.

SUMMARY

The embodiments described herein provide in one aspect, a method for data masking at least one target data field of a target data record, the method comprising:

a) providing at least one original database containing data records, wherein said data records include at least one target data record containing at least one target data field;

b) providing a copied database which includes a copy of at least a portion of the at least one original database; and c) generating a masked database to replace the copied database, wherein said at least one target data field of said at least one target data record has been masked, by conducting data masking on the copied database, said data masking comprising:

i) adding a row-identifier column with an index to a primary data record to form a primary row-identifier data record;

ii) for each target data field of said primary data record that needs to be masked, creating an empty delta data record;

iii) performing at least one data transformation on said target data fields to form masked delta data records;

iv) merging said masked delta data records with said primary row-identifier data record to form a masked primary data record;

v) copying a related data record and joining with said primary row-identifier data record to form a related row-identifier data record;

vi) merging said related row-identifier data record with said masked primary data record to form a masked related data record;

vii) repeating steps (v) and (vi) for each related data record that needs to be masked; and viii) repeating steps (i) to (vi) for each primary data record that needs to be masked.

The embodiments described herein further provide in another aspect, a system for data masking at least one target data field of at least one data record, the system comprising:

a) a memory for storing data records;

b) a processor coupled to the memory for:

i) providing at least one original database containing the data records, wherein said data records include at least one target data record containing at least one target data field;

ii) providing a copied database which includes a copy of at least a portion of the at least one original database; and iii) generating a masked database to replace the copied database, wherein said at least one target data field of said at least one target data record has been masked, by conducting data masking on the copied database, said data masking comprising:

I. adding a row-identifier column with an index to a primary data record to form a primary row-identifier data record;

II. for each target data field of said primary data record that needs to be masked, creating an empty delta data record;

III. performing at least one data transformation on said target data fields to form masked delta data records;

IV. merging said masked delta data records with said primary row-identifier data record to form a masked primary data record;

V. copying a related data record and joining with said primary row-identifier data record to form a related row-identifier data record;

VI. merging said related row-identifier data record with said masked primary data record to form a masked related data record;

VII. repeating steps (V) and (VI) for each related data record that needs to be masked; and VIII. repeating steps (I) to (VI) for each primary data record that needs to be masked.

Further aspects and advantages of the embodiments described herein will appear from the following description taken together with the accompanying drawings.

BRIEF DESCRIPTION OF THE DRAWINGS

For a better understanding of the present invention, and to demonstrate more clearly how it may be carried into effect, reference will now be made, by way of example, to the accompanying drawings which show some examples of the present invention, and in which.

Figure 1:
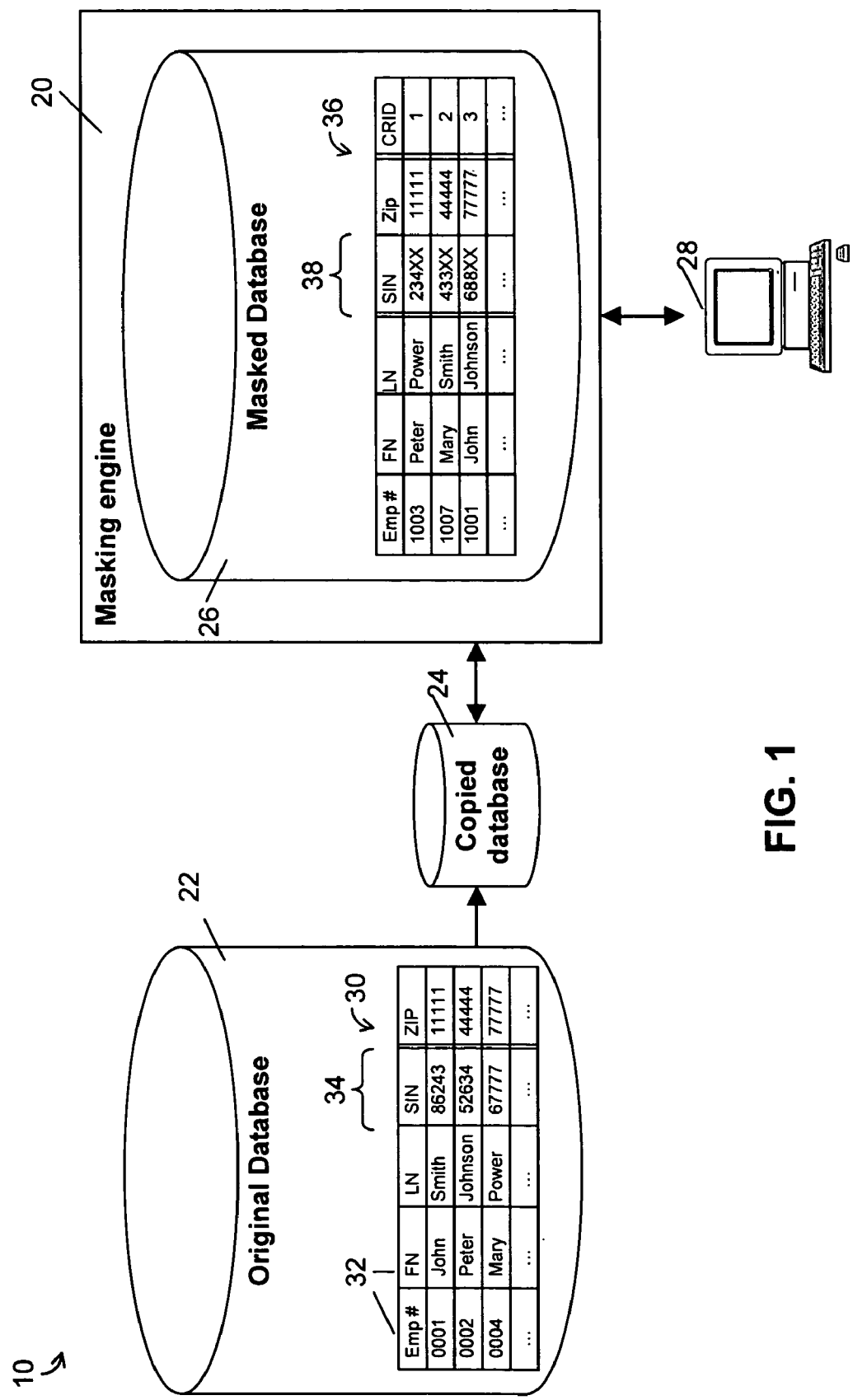
FIG. 1 is a block diagram of an example implementation of the data masking system of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements or steps.

DETAILED DESCRIPTION

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, sever, personal computer, laptop, personal data assistant, and cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Reference is first made to FIG. 1, which illustrates the data masking system 10 made in accordance with a preferred embodiment of the present invention. Data masking system 10 includes at least one original database 22, at least one copied database 24 which is created by copying at least a portion of the original database 22, a computer 28, and a masking engine 20 for interfacing between the copied database 24 and the computer 28.

Original database 22 contains a number of data records 30, with each data record 30 containing at least one data field 32, at least some of which are target data fields 34. While the present embodiments will be described in relation to the specific application of masking of confidential data, it should be understood that the present embodiments could be used to mask any type of data, confidential or not. For example, the data that is desired to be masked (i.e. "target data" as discussed above) could be non-confidential information on its own, but when combined internally within the database or with another database could identify sensitive identity information.

As discussed above, the copied database 24 is created by making a copy of at least a portion of the original database 22 and contains a number of target (e.g. "confidential" for this example implementation) data records (not shown), with each target (e.g. confidential in this discussion) data record containing a number of data fields (not shown), at least some of which are target (e.g. confidential in this discussion) data fields.

Masking engine 20 is the core of the data masking system 10 and performs data masking operations on the copied database 24, rather than on the original database 22 (as will be discussed further below), resulting in a masked database 26. Recognizing the need for portability, it is intended that masking engine 20 is database and platform independent, allowing widespread usability and applicability of the data masking system 10 to all enterprises. A user can configure masking engine 20 with their customized data masking requirements through the use of computer 28. Any method of communication known in the art may be used between computer 28 and masking engine 20, and it need not be a hardwired network, and may be wireless.

It should be understood that the computer 28 can be a desktop computer, or any other type of computing device that includes a processor and memory, such as a mainframe computer, server, laptop computer, hand-held device, etc. Further, it is intended that computer 28 can also be used to view the current data in the copied database 24 and immediately view the results of the data masking in the masked database 26.

Upon execution of data masking by masking engine 20, the masked database 26 replaces the copied database 24. The masked database 26 contains a number of masked data records 36, where the confidential data fields 34 from the original database 22 are now transformed into masked data fields 38. More importantly, the masked database 26 has all of the look-and-feel and technical properties of the original database 22, except that all confidential information will have been masked. The masked database 26 also retains all of the behavior of the original database 22, including relational integrity at two levels: at the database level and at the application level, as will be described in more detail.

First, database relationships are maintained (e.g. if a customer entry is pointing to 3 customer orders, the new masked entry will point to the same 3 orders). Second, at the application level (e.g. when dealing with enterprise resource planning (ERP) databases such as PeopleSoft™ manufactured by Oracle of California, U.S.A.), all related fields which are usually defined from within the application can be identified and masked accordingly.

Figure 2:
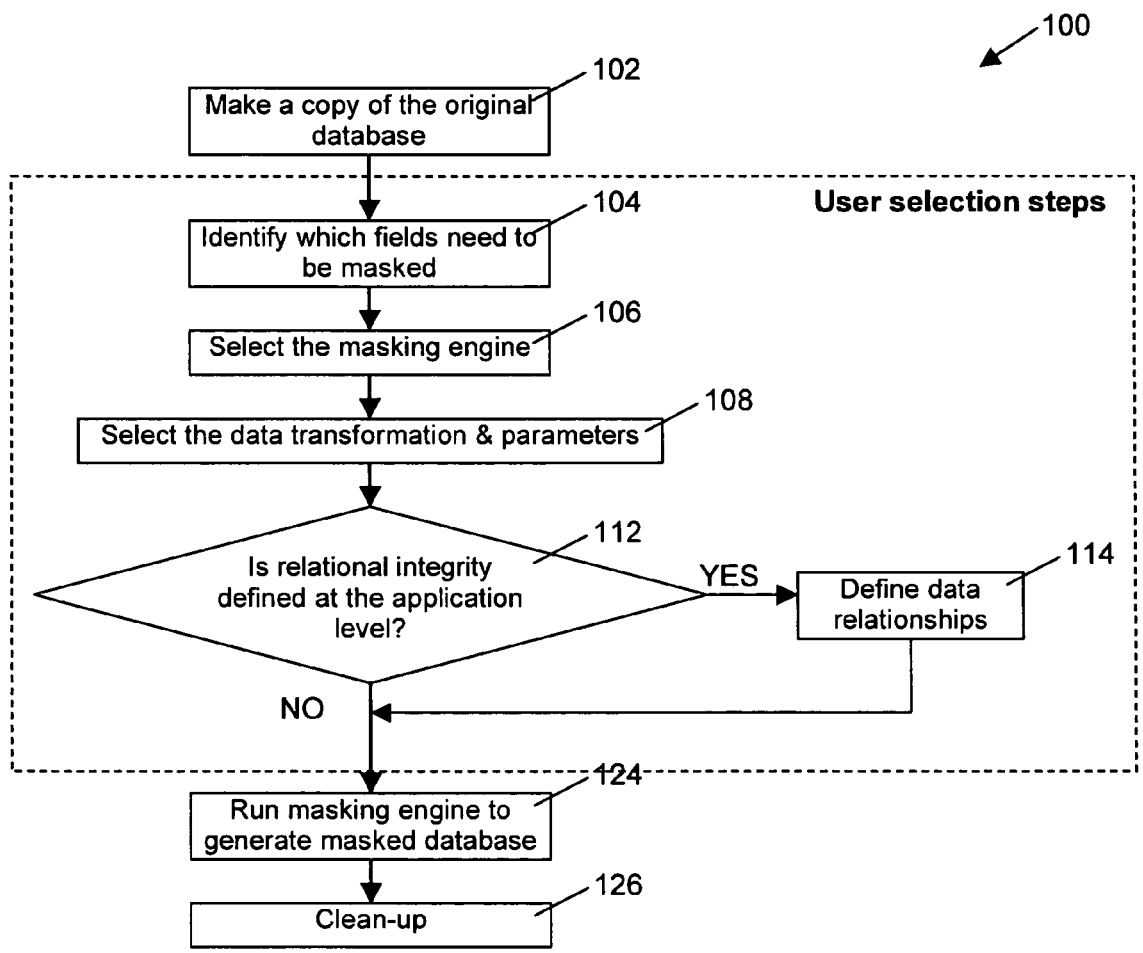
FIG. 2 is a flowchart illustrating the general process steps conducted by the data masking system of FIG. 1.

Referring now to FIG. 2, the general operation steps 100 of the data masking system 10 will now be described. The process begins with step (102), where the copied database 24 is created by copying at least a portion of the original database 22 and the masking engine 20 is configured to access this copy. The copying can either be made by a database administrator or by masking engine 20 itself.

In this way, all data masking operations carried out by masking engine 20 are carried out against copied database 24, instead of operating directly on the original database 22 (as is usually done in the prior art). This provides the benefit that all the data records, data types, and relationships between data elements are already established in the copied database 24, without the need for manually mapping all of the data fields one-by-one from the original database 22 to the masked database 26, which is a very labor intensive process. Further, the masking project can be configured to retrieve and manipulate directly the copied database 24, without concern of negatively affecting the original database 22 in any way. It should be understood that the associated copying functions may be carried out within the masking engine 20.

The user selection steps (104) to (114) are then executed for the purpose of configuring masking engine 20 for the desired data masking of the current masking project. This configuration may be executed by means of computer 28 sending user selection requests to masking engine 20. For example, computer 28 can display a graphical user interface (GUI) window to allow the user to make the appropriate user selection by accessing the copied database 24 through masking engine 20.

At step (104), confidential data fields 34 of the confidential data records 30 of the original database 22 (and corresponding copied database 24) which need to be masked are identified.

At step (106), the appropriate masking engine is selected. In the present invention, two possible masking engines are disclosed—"update engine" and "insert engine" (as will be further discussed below).

The way that a particular confidential data field 34 should be disguised depends on the type of information it contains as well as the intended use of the masked data field 38 in the resultant masked database 36. As such, at step (108), the user selects and customizes the desired data masking for the current masking project.

At step (108), pre-defined data transformations and associated parameters may be selected by the user, or customized variations of pre-defined data transformations or entirely custom transformations can be developed. Some pre-defined data transformations that may be used include the following: data combination transformer, credit card number generator, data load transformer, date generator, date transformer, encryption transformer, generic luhn generator, national ID generator, noise transformer, random number transformer, replace transformer, scramble transformer, script transformer, sequential number transformer, data shuffle transformer table delete transformer, update rows transformer, and update transformer. Further, each data transformation has parameters that can be customized to meet specific needs of the current masking project.

For example, the user would indicate the data elements to be masked (typically tables and fields) and would specify the data transformation (e.g. credit card number generator) to be used when masking. Additional configuration parameters such as credit card type and randomization pattern could also be specified. Multiple transformations are specified in the same way (table, field, data transformation and parameters) allowing complex masking rules to be configured incrementally.

At step (112), if data relationships within the original database 22 are defined at the application level, then the selected relationships within the original database 22 (and corresponding copied database 24) will need to be defined at step (114) to maintain relational integrity in the resultant masked database 26. Once the masking engine 20 knows which data fields 32 to relate, the masking engine 20 can identify all confidential data records 30 associated with that data field 32 contained in the copied database 24 (which is a copy of at least a portion of the entire original database 22). Thus, when masking engine 20 is invoked, it reads the list of related data fields 32 and related confidential data records 30 and processes them in the required order to maintain the original relationships while masking the confidential data.

After the user selection steps (104) to (114) have been executed, the computer 28 then configures masking engine 20 according to the data masking desired. Initially, the chosen masking engine ("update" or "insert") is initiated. The masking engine is then provided with the list of data elements to be masked, the appropriate transformation to be applied to each, and the correct order of transformation.

Based on the selected data transformations, a dependency analyzer module (not shown) can optionally be run prior to running masking engine at step (124) to determine the dependency of the various data transformations required and hence schedule the data transformations in the optimal order to maintain relational integrity in the resultant masked database 36 and optimize performance of masking engine 20.

For example, if the original database 22 contained three sensitive data fields—First Name, Last Name and Full Name—the need for the dependency analyzer becomes clear. Full name cannot be masked before First or Last name as the result would contain unmasked data. In this case, the dependency analyzer determines that Full Name is dependent upon First and Last name and therefore is automatically configured to run after masking of First and Last name has completed.

Finally, at step (124), the masking engine 20 runs the masking project based on the configurations from steps (104) to (114) on copied database 24 to result in a masked database 26 (which replaces copied database 24) containing masked data records 36, where the confidential data fields 34 from the original database 22 are now masked data fields 38.

At step (126), clean-up operations are performed to remove the temporary data records which were created during the data masking process to free-up space and so that only the resultant masked data record 36 of masked database 26 remains.

As discussed above, when the masking engine type is selected at step (106) for masking engine 20, two different approaches can be chosen: the "update engine" and the "insert engine". It is intended that the "update engine" be used to efficiently mask smaller data volumes, while the "insert engine" be used to mask large volumes of data (as it uses a bulk load method for database loading).

Figure 3:
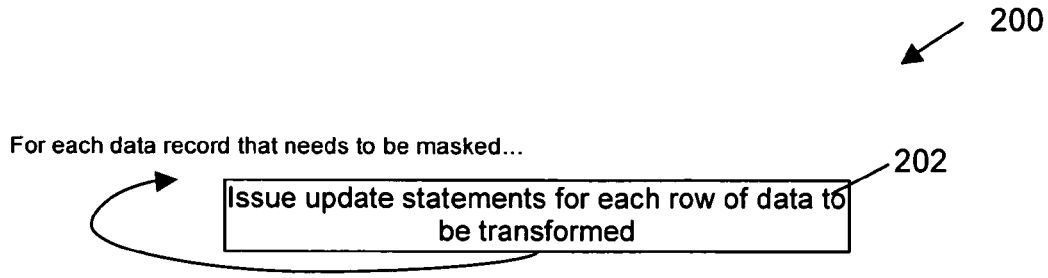
FIG. 3 is a flowchart illustrating the process steps conducted by the masking engine using an example implementation of the "update engine" masking engine within the data masking system of FIG. 1.
Figure 4:
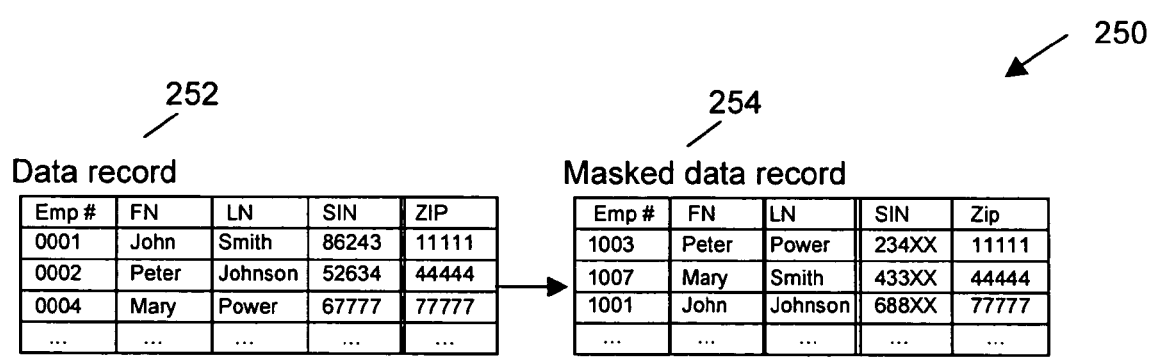
FIG. 4 is a schematic diagram corresponding to the flowchart of FIG. 3, illustrating the process steps using an example implementation of the "update engine" masking engine as exercised by the masking engine within the data masking system of FIG. 1.

The "update engine" is the more basic masking engine type, with the data masking operations being performed directly on the data record 30 being masked. Reference is now made to FIG. 3, which is a flowchart illustrating the process steps 200 of the "update engine" masking engine, and FIG. 4, which is a schematic diagram 250 corresponding to the flowchart of FIG. 3. At step (202), data masking is exercised on all required confidential data fields by issuing a series of update statements to the data record 252 for each row of data to be transformed according to the data transformations configured at step (108) in the user selection process previously described, resulting in masked data record 254. Step (202) is then repeated for each data record 252 that needs to be masked.

The "insert engine" is the more complicated masking engine, and is targeted to optimize the performance of data masking on larger and more complex databases by using a "bulk load" method. The term "bulk load" often refers to loading data from outside the database, although it is used in this application to describe the loading of data from one structure within a database to another structure in the same database. This manner of loading large amounts of data into a database bypasses typical database overhead processing, resulting in shorter processing times. The "insert engine" is designed to operate optimally on databases where there are primary data records and associated related data records (i.e. databases with related data fields).

Figure 5:
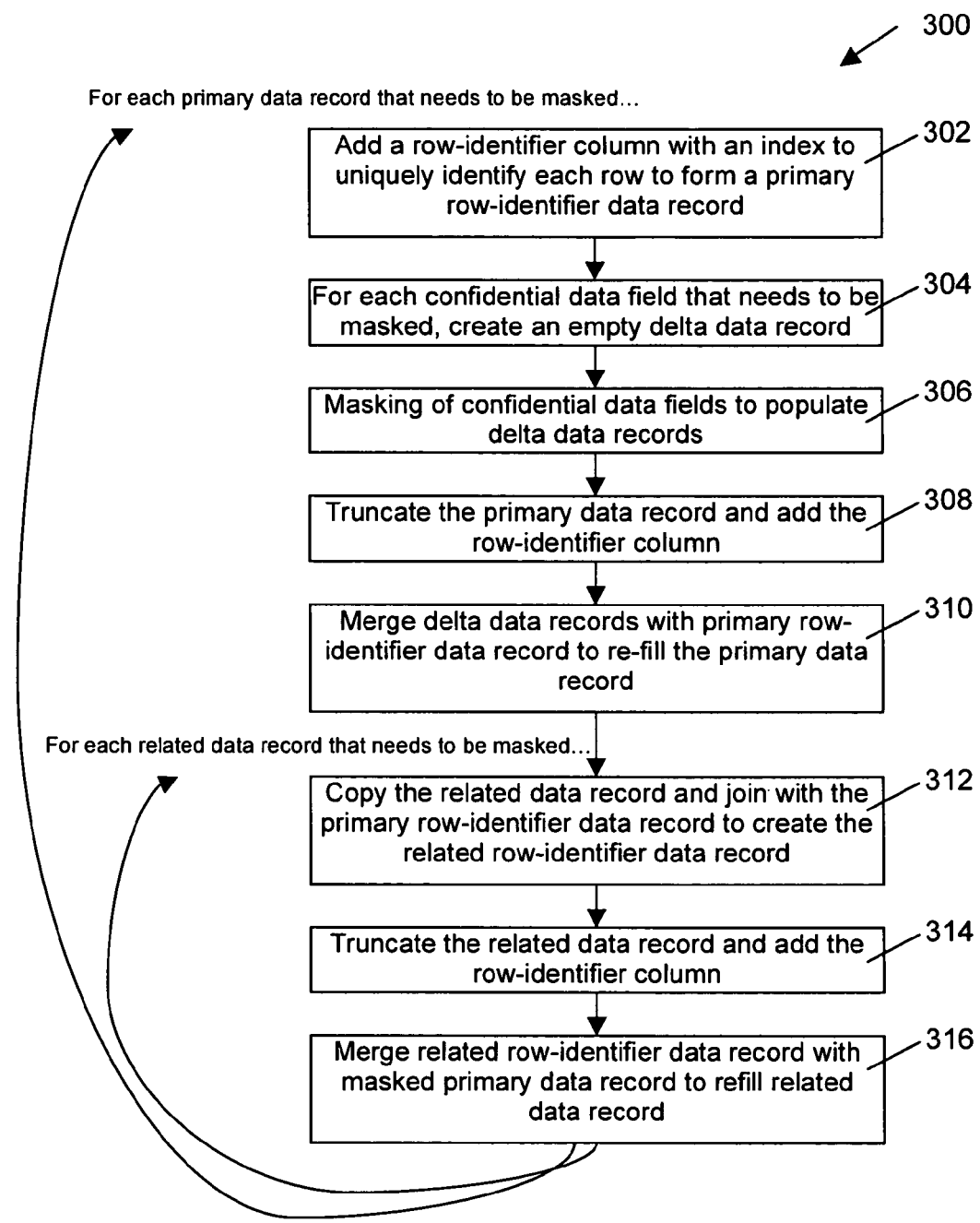
FIG. 5 is a flowchart illustrating the process steps conducted by the masking engine using an example implementation of the "insert engine" masking engine within the data masking system of FIG. 1.
Figure 6:
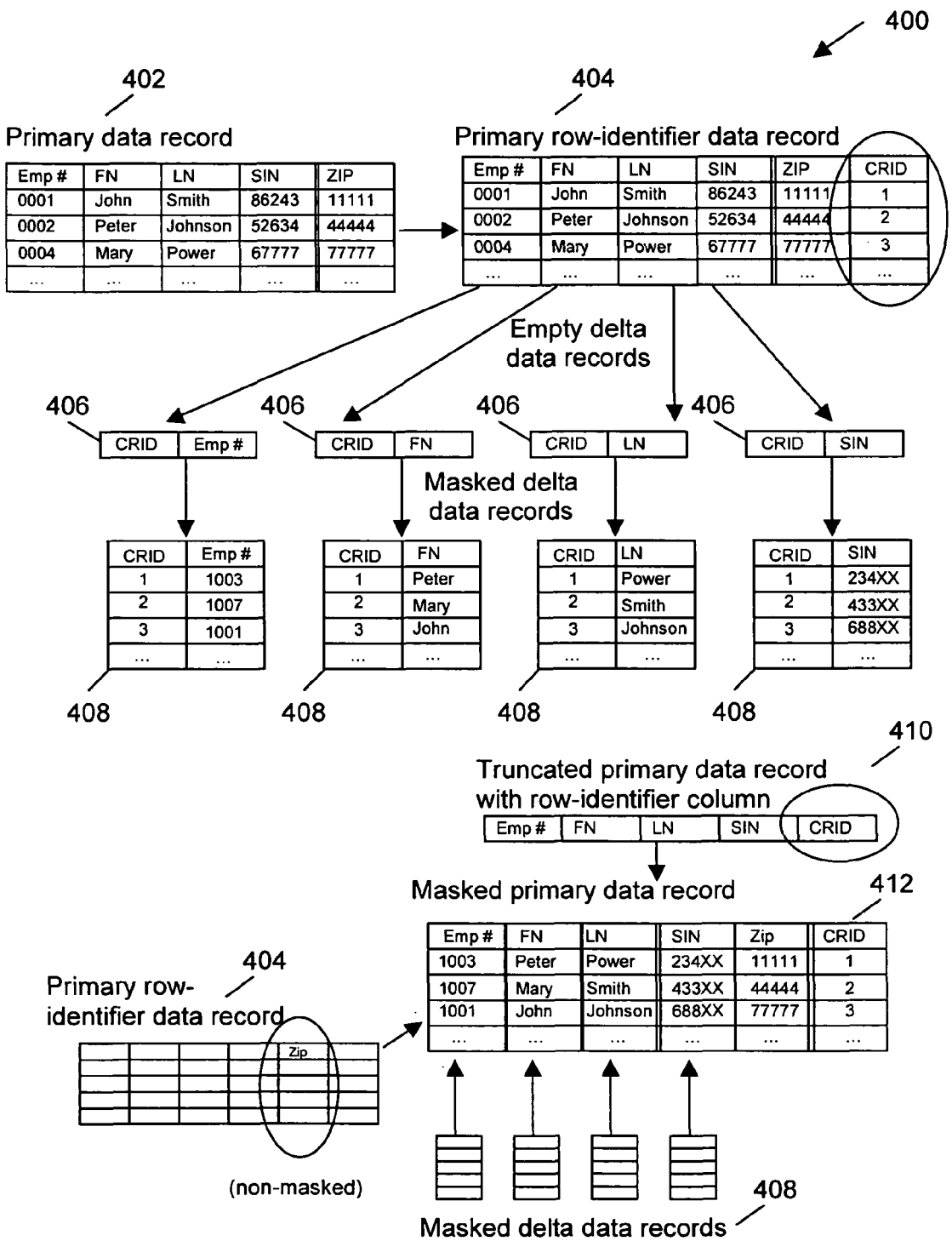
FIG. 6 is a schematic diagram corresponding to the flowchart of FIG. 5, illustrating the process steps using an example implementation of the "insert engine" masking engine on a primary data record as exercised by the masking engine within the data masking system of FIG. 1.
Figure 7:
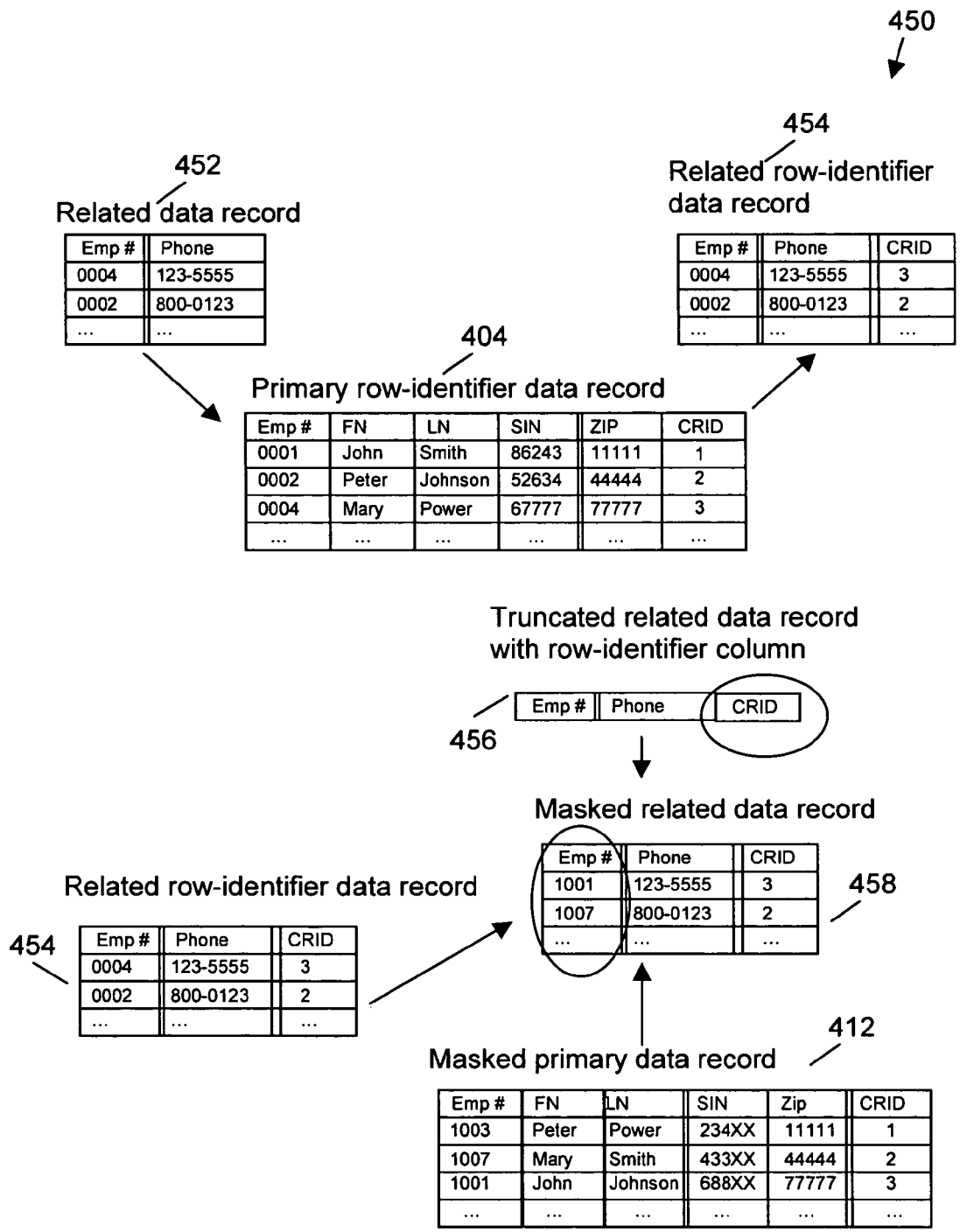
FIG. 7 is a schematic diagram corresponding to the flowchart of FIG. 5, illustrating the process steps using an example implementation of the "insert engine" masking engine on a related data record as exercised by the masking engine within the data masking system of FIG. 1.

Reference is now made to FIG. 5, which is a flowchart illustrating the process steps 300 of the "insert engine" masking engine transformer, and FIGS. 6 and 7, which are schematic diagrams 400 and 450 corresponding to the flowchart of FIG. 5. At step (302), a primary row-identifier data record 404 is formed by making a copy of the primary data record 402 and adding a column with a new index (e.g. the Complex Row Identifier "CRID" column in FIG. 6) to uniquely identify each row of the primary data record 402. This is done because the unique identifier that already exists in the data record may itself be masked or the uniqueness definition may be complex. Complex uniqueness definitions typically require two or more data fields to uniquely identify a data row, as opposed to requiring a single data field to uniquely identify a data row. The new index also supports related field processing as will be described in subsequent steps (i.e. with related data records).

At step (304), empty delta data records 406 are created for each confidential data field in the primary row-identifier data record 404 that needs to be masked for the purpose of holding masked data later at step (306). An empty delta data record 406 is created with two columns: an empty column for the row-identifier index and an empty column for the data field to be masked.

At step (306), data masking is conducted for all required confidential data fields by populating the empty delta data records 406 with the masked data according to the data transformations configured at steps (108) and (110) in the user selection process previously described. These masked delta data records 408 will be later used in the merge step (310) to create the masked primary data record 412. Through the use of delta data records, performance is enhanced over the "update engine" masking engine transformer as bulk loading of the original data record is significantly faster than writing row-by-row updates to it.

At step (308), a truncated primary data record with row-identifier column 410 is created by truncating the primary data record 402. Specifically, the truncated primary data record with row-identifier column 410 is created by erasing all data within the primary data record to make room for the creation of the masked primary data record 412. At step (310), the masked primary data record 412 is formed by inserting the masked data from the masked delta data records 408 and the remaining unmasked data from the primary row-identifier data record 404 using the bulk load method. The merge uses the row-identifier index as the common identifier for performing this operation.

The steps (312), (314) and (316), are performed for each related data record 452 that needs to be masked.

At step (312), a related row-identifier data record 454 is formed by making a copy of the related data record 452 and adding a column with a new index to uniquely identify each row of the related data record 452. The related row-identifier data record 454 serves basically the same purpose in masking related data records as the primary row-identifier data record 404 in masking primary data records. The row-identifier is particularly useful when the original primary key (unique identifier) is being masked or the uniqueness definition may be complex as discussed above.

Steps (314) and (316) are essentially the same as steps (308) and (310) above, with the only difference being that steps (314) and (316) are performed for related data records while steps (308) and (310) are performed for primary data records. At step (314), the related data record 452 is truncated 456 by erasing all data to make room for the creation of the masked related data record 458 and the row-identifier column is added to the truncated related data record. The masked related data record 458 is formed by inserting the masked data from the masked primary data record 412 and the unmasked data from the related row-identifier data record 454 at step (316). The merge uses the row-identifier index as the common identifier for performing this operation.

Finally, steps (302) to (316) are then repeated for each primary data record 402 that needs to be masked.

It will be appreciated that while the present embodiments have been described in the context of various methods, the system, processes and methods of these embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for masking data from an original database to produce a masked database, the original database comprising at least one primary data table having at least one target data column, the method comprising:
   a) copying the primary data table from the original database into a copied database;
   b) adding a row-identifier column to the primary data table in the copied database to produce a primary row-identifier data table;
   c) generating a plurality of index values and populating the primary row-identifier column with the index values, wherein each of the index values identifies a row of the primary row-identifier data table;
   d) for each target data column of the primary row-identifier data table:
      (i) creating an empty delta data table;
      (ii) performing a data transformation on the data in the target data column to produce masked data; and
      (iii) populating the empty delta data table with the masked data and the index values to produce a masked delta data table; and
   e) merging each of the masked delta data tables produced in step d) (iii) with the primary row-identifier data table to produce a masked primary data table, wherein for each masked delta data table, the merging comprises populating each row of the masked primary data table with masked data from the masked delta data table associated with the index value for a corresponding row.

2. The method of claim 1, wherein said masked database retains the behavior of said original database, wherein said behavior of said masked database includes the relational integrity in at least one of the database level and the application level.

3. The method of claim 1, wherein said data transformations are predefined and include at least one transformer selected from the group consisting of: data combination transformer, credit card number generator, data load transformer, date generator, date transformer, encryption transformer, generic luhn generator, national ID generator, noise transformer, random number transformer, replace transformer, scramble transformer, script transformer, sequential number transformer, data shuffle transformer table delete transformer, update rows transformer, and update transformer.

4. The method of claim 1, wherein said data transformations are selected through a graphical user interface (GUI).

5. The method of claim 1, wherein said data transformations are created using scripting code.

6. The method of claim 1, wherein said method further includes setting parameters associated with each data transformation.

7. The method of claim 1, wherein said method further includes determining from the copied database whether data relationships within said original database are defined at the application level, and if so, defining data relationships.

8. The method of claim 1, wherein said method includes the step of analyzing the dependency of the various data transformations required and scheduling the data transformations in an optimal order.

9. The method of claim 1, wherein the at least one target data field is a confidential data field.

10. The method of claim 1, wherein the original database further comprises at least one related data table, and the method further comprises:
   copying the at least one related data table from the original database into the copied database; and
   for each related data table:
      joining the related data table in the copied database and the primary row identifier data table to produce a related row-identifier data table; and
      merging the related row-identifier data table with the masked primary data table to produce a masked related data table.

11. A tangible computer-readable storage medium upon which a plurality of instructions are stored, the instructions for performing a plurality of steps for masking data from an original database to produce a masked database, the original database comprising at least one primary data table having at least one target data column, the steps comprising:
   a) copying the primary data table from the original database into a copied database;
   b) adding a row-identifier column to the primary data table in the copied database to produce a primary row-identifier data table;
   c) generating a plurality of index values and populating the primary row-identifier column with the index values, wherein each of the index values identifies a row of the primary row-identifier data table;
   d) for each target data column of the primary row-identifier data table:
      (i) creating an empty delta data table;
      (ii) performing a data transformation on the data in the target data column to produce masked data; and
      (iii) populating the empty delta data table with the masked data and the index values to produce a masked delta data table; and
   e) merging each of the masked delta data table produced in step d) (iii) with the primary row-identifier data table to produce a masked primary data table, wherein for each masked delta data table, the merging comprises populating each row of the masked primary data table with masked data from the masked delta data table associated with the index value for a corresponding row.

12. The system of claim 11, wherein said masked database retains the behavior of said original database, wherein said behavior of said masked database includes the relational integrity in at least one of the database level and the application level.

13. The system of claim 11, wherein said data transformations are predefined and include at least one transformer selected from the group consisting of: data combination transformer, credit card number generator, data load transformer, date generator, date transformer, encryption transformer, generic luhn generator, national ID generator, noise transformer, random number transformer, replace transformer, scramble transformer, script transformer, sequential number transformer, data shuffle transformer table delete transformer, update rows transformer, and update transformer.

14. The system of claim 11, wherein said data transformations are selected through a graphical user interface (GUI).

15. The system of claim 11, wherein the data transformations are created using scripting code.

16. The system of claim 11, wherein the processor is adapted to set parameters associated with each data transformation.

17. The system of claim 11, wherein the processor is further adapted to determine from the copied database whether data relationships within said original database are defined at the application level, and if so, defining data relationships within the copied database.

18. The system of claim 11, wherein the processor is further adapted to analyze the dependency of the various data transformations required and scheduling the data transformations in an optimal order.

19. The system of claim 11, wherein the at least one target data field is a confidential data field.

20. A system for masking data from an original database to produce a masked database, the original data base comprising at least one primary data table having at least one target data column, the system comprising:
  a) a memory for storing data records;
  b) a processor coupled to the memory for
    (i) copying the primary data table from the original database into a copied database;
    (ii) adding row-identifier column to the primary data table in the copied database to produce a primary row-identifier data table;
    (iii) generating a plurality of index values and populating the primary row-identifier column with the index values, wherein each of the index values identifies a row of the primary row-identifier data table;
    (iv) for each target data column of the primary row identifier data table:
      I. creating an empty delta data table;
      II. performing at least one data transformation on the data in the target data column to produce masked data; and
      III. populating the empty delta table with the masked data and the index values to produce a masked delta data table; and
    (v) merging each of the masked delta data tables created in step (iv) III with the primary row-identifier data table to produce a masked primary data table, wherein for each masked delta data table, the merging comprises populating each row of the masked primary data table with masked data from the masked delta data table associated with the index value for a corresponding row.

21. The system of claim 20, wherein the original database further comprises at least one related data table, and the processor is further adapted for:
  copying the at least one related data table from the original database into the copied database; and
  for each of the at least one related data table:
    joining the related data table in the copied database and the primary row identifier data table to produce a related row-identifier data table; and
    merging the related row-identifier data table with the masked primary data table to produce a masked related data table.

* * * * *

UNITED STATES PATENT AND TRADEMARK OFFICE
CERTIFICATE OF CORRECTION

PATENT NO. : 7,974,942 B2  
APPLICATION NO. : 11/517251  
DATED : July 5, 2011  
INVENTOR(S) : Steven Patrick Pomroy, Robert Raymond Lake and Trevor Anthony Dunn Page 1 of 1

It is certified that error appears in the above-identified patent and that said Letters Patent is hereby corrected as shown below:

Column 11, Line 8, in Claim 20:
"data base" should read -- database --

Column 12, Line 1, in Claim 20:
"delta table" should read -- delta data table --

Column 12, Line 5, in Claim 20:
"instep" should read -- in step --

Signed and Sealed this
Eighteenth Day of October, 2011

David J. Kappos
*Director of the United States Patent and Trademark Office*